US011451123B2

United States Patent
Fatemi et al.

(10) Patent No.: US 11,451,123 B2
(45) Date of Patent: Sep. 20, 2022

(54) EXPANDABLE ROTOR

(71) Applicant: GM Global Technology Operations LLC, Detroit, MI (US)

(72) Inventors: Alireza Fatemi, Canton, MI (US); Thomas W. Nehl, Shelby Township, MI (US); Derek F. Lahr, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 17/083,747

(22) Filed: Oct. 29, 2020

(65) Prior Publication Data

US 2022/0140713 A1 May 5, 2022

(51) Int. Cl.
| | |
|---|---|
| *H02K 21/02* | (2006.01) |
| *H02K 21/22* | (2006.01) |
| *H02K 21/24* | (2006.01) |
| *H02K 21/28* | (2006.01) |

(52) U.S. Cl.
CPC ................... *H02K 21/024* (2013.01)

(58) Field of Classification Search
CPC ....... H02K 21/02; H02K 21/024; H02K 21/28

USPC ............................................. 310/156.24, 191
See application file for complete search history.

(56) References Cited

U.S. PATENT DOCUMENTS

| 4,641,080 A * | 2/1987 | Glennon ................... H02P 9/40 |
| | | 310/152 |
| 2013/0293042 A1* | 11/2013 | Ribarov ................... H02K 9/19 |
| | | 310/59 |

FOREIGN PATENT DOCUMENTS

JP          08080019 A  *  3/1996

* cited by examiner

*Primary Examiner* — Jose A Gonzalez Quinones
(74) *Attorney, Agent, or Firm* — Vivacqua Crane, PLLC (57) ABSTRACT

An electric machine includes a stator and a rotor positioned in operational engagement with one another and defining a radial gap extending circumferentially between the stator and the rotor, the rotor including a plurality of rotor segments defining a plurality of segment gaps between adjacent pairs of the plurality of rotor segments, the rotor segments radially moveable relative to the stator, wherein movement of the plurality of rotor segments radially outward increases the radial gap between the stator and the rotor and the segment gaps between adjacent pairs of the plurality of rotor segments.

20 Claims, 11 Drawing Sheets

FIG. 10D

EXPANDABLE ROTOR

INTRODUCTION

The present disclosure relates to an electric machine having an expandable rotor.

An electric machine, such as an outer rotor electric motor, has a stationary stator and a rotating rotor positioned outside of the stator. A radial gap extends circumferentially between the moving rotor and the stationary stator core. This radial gap is an air gap between the rotor and the stator, and is a necessary part of electric motor design. The size of the radial gap is one of the keys to motor performance and reliability. The radial gap needs to be large enough to prevent contact between the rotor and stator, taking into account tolerances related to their respective dimensions, loose bearings, and movement that results from deflection during operation. In addition, if the rotor is eccentric relative to the stator and the air gap is too small, the stiffness of the shaft might be overcome by the resulting unbalanced magnetic pull. This, in turn, leads to damage resulting from the rotor striking the stator as it is pulled out of place by the magnetic forces.

At the same time, the radial gap needs to be as small as possible because wider radial gaps require more power to achieve magnetization. In short, a radial gap that is wider than necessary could have a negative impact on the peak load efficiency and performance of the electric motor. Traditionally, electric motors are designed with a radial gap that is dimensioned specifically to take into account the considerations discussed above.

Often, permanent magnet electric motors experience high power losses when operating at high speeds. This is due to lack of control over the permanent magnet magnetic field. Mechanical field weakening could provide a solution for reducing high speed losses. Known active mechanical field weakening methods require complex actuation mechanisms that are cost prohibitive.

Thus, while current electric motors achieve their intended purpose, there is a need for a new and improved electric machine having an expandable rotor that passively weakens the magnetic field and may allow selective control of the field weakening.

SUMMARY

According to several aspects of the present disclosure, an electric machine includes a stator and a rotor positioned in operational engagement with one another and defining a radial gap extending circumferentially between the stator and the rotor, the rotor including a plurality of rotor segments defining a plurality of segment gaps between adjacent pairs of the plurality of rotor segments, the rotor segments radially moveable relative to the stator, wherein movement of the plurality of rotor segments radially outward increases the radial gap between the stator and the rotor and the segment gaps between adjacent pairs of the plurality of rotor segments.

According to another aspect, the plurality of rotor segments are flexibly held in position relative to one another such that when the rotor spins centrifugal forces cause the plurality of rotor segments to move radially outward expanding the radial gap between the rotor and the stator.

According to another aspect, each adjacent pair of the plurality of rotor segments are flexibly connected to one another by a spring.

According to another aspect, each adjacent pair of the plurality of rotor segments are flexibly connected to one another by a plurality of parallel springs.

According to another aspect, a garter spring extends circumferentially around the plurality of rotor segments.

According to another aspect, a plurality of garter springs extend, parallel to one another, circumferentially around the plurality of rotor segments.

According to another aspect, a layer of elastomeric material extends circumferentially around the plurality of rotor segments.

According to another aspect, the electric machine further includes a pair of flex plates, one flex plate being positioned at opposing distal ends of the electric machine, each flex plate including a plurality of plate segments, each of the plate segments being attached to one of the plurality of rotor segments.

According to another aspect, each adjacent pair of the plurality of plate segments of each flex plate are flexibly connected to one another by a spring.

According to another aspect, each adjacent pair of the plurality of plate segments of each flex plate are flexibly connected to one another by a plurality of parallel springs.

According to another aspect, each flex plate includes a garter spring extending circumferentially around the plurality of plate segments.

According to another aspect, each flex plate includes a plurality of garter springs extending, parallel to one another, circumferentially around the plurality of plate segments.

According to another aspect, each flex plate includes a layer of elastomeric material extending circumferentially around the plurality of plate segments.

According to another aspect, the electric machine further includes a sleeve extending circumferentially around the plurality of rotor segments, the sleeve adapted to stop movement of the plurality of rotor segments radially outward to limit further expansion of the radial gap.

According to another aspect, the sleeve includes a plurality of ferrous wedges extending radially inward, one ferrous wedge extending into the segment gap between each adjacent pair of rotor segments and adapted to provide a continuous conductive connection between each adjacent pair of rotor segments as the plurality of rotor segments move radially outward and the segment gap between each adjacent pair of rotor segments increases.

According to another aspect, each of the plurality of rotor segments includes an axial pin extending therefrom, the electric machine further including a torque plate rotationally fixed to the rotor and having a plurality of expansion channels, the axial pin of each of the plurality of rotor segments positioned within one of the plurality of expansion channels, and an expansion plate, rotatable relative to the torque plate and the rotor and having a plurality of control channels, the axial pin of each of the plurality of rotor segments positioned within one of the plurality of control channels, wherein the plurality of expansion channels and the plurality of control channels are not collinear or parallel, such that radial movement of the plurality of rotor segments is controlled by rotational movement of the expansion plate relative to the torque plate.

According to several aspects of the present disclosure, an electric machine includes a stator and a rotor positioned in operational engagement with one another and defining a radial gap extending circumferentially between the stator and the rotor, the rotor including a plurality of rotor segments defining a plurality of segment gaps between adjacent pairs of the plurality of rotor segments, the plurality of rotor segments radially moveable relative to the stator and flexibly held in position relative to one another such that when the rotor spins, centrifugal forces cause the plurality of rotor segments to move radially outward expanding the radial gap between the rotor and the stator and the segment gaps between adjacent pairs of the plurality of rotor segments, and a sleeve extending circumferentially around the plurality of rotor segments, the sleeve adapted to stop movement of the plurality of rotor segments radially outward to limit further expansion of the radial gap and including a plurality of ferrous wedges extending radially inward, one ferrous wedge extending into the segment gap between each adjacent pair of rotor segments and adapted to provide a continuous conductive connection between each adjacent pair of rotor segments as the plurality of rotor segments move radially outward and the segment gap between each adjacent pair of rotor segments increases.

According to another aspect, the plurality of rotor segments are flexibly held in position by one of a spring connecting each adjacent pair of the plurality of rotor segments, a plurality of parallel springs connecting each adjacent pair of the plurality of rotor segments, a garter spring extending circumferentially around the plurality of rotor segments, a plurality of garter springs extending, parallel to one another, circumferentially around the plurality of rotor segments, and a layer of elastomeric material extending circumferentially around the plurality of rotor segments.

According to another aspect, the electric machine further includes a pair of flex plates, one flex plate being positioned at opposing distal ends of the electric machine, each flex plate including a plurality of plate segments, each of the plate segments being attached to one of the plurality of rotor segments, the plurality of plate segments flexibly held in position by one of a spring connecting each adjacent pair of the plurality of plate segments of each flex plate, a plurality of parallel springs connecting each adjacent pair of the plurality of plate segments of each flex plate, a garter spring extending circumferentially around the plurality of plate segments of each flex plate, a plurality of garter springs extending, parallel to one another, circumferentially around the plurality of plate segments of each flex plate, and a layer of elastomeric material extending circumferentially around the plurality of plate segments of each flex plate.

According to another aspect, each of the plurality of rotor segments includes an axial pin extending therefrom, the electric machine further including a torque plate rotationally fixed to the rotor and having a plurality of expansion channels, the axial pin of each of the plurality of rotor segments positioned within one of the plurality of expansion channels, and an expansion plate, rotatable relative to the torque plate and the rotor and having a plurality of control channels, the axial pin of each of the plurality of rotor segments positioned within one of the plurality of control channels, wherein the plurality of expansion channels and the plurality of control channels are not collinear or parallel, such that radial movement of the plurality of rotor segments is controlled by rotational movement of the expansion plate relative to the torque plate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The description of the present disclosure is merely exemplary in nature and variations that do not depart from the gist of the present disclosure are intended to be within the scope of the present disclosure. Such variations are not to be regarded as a departure from the spirit and scope of the present disclosure.

Figure 1:
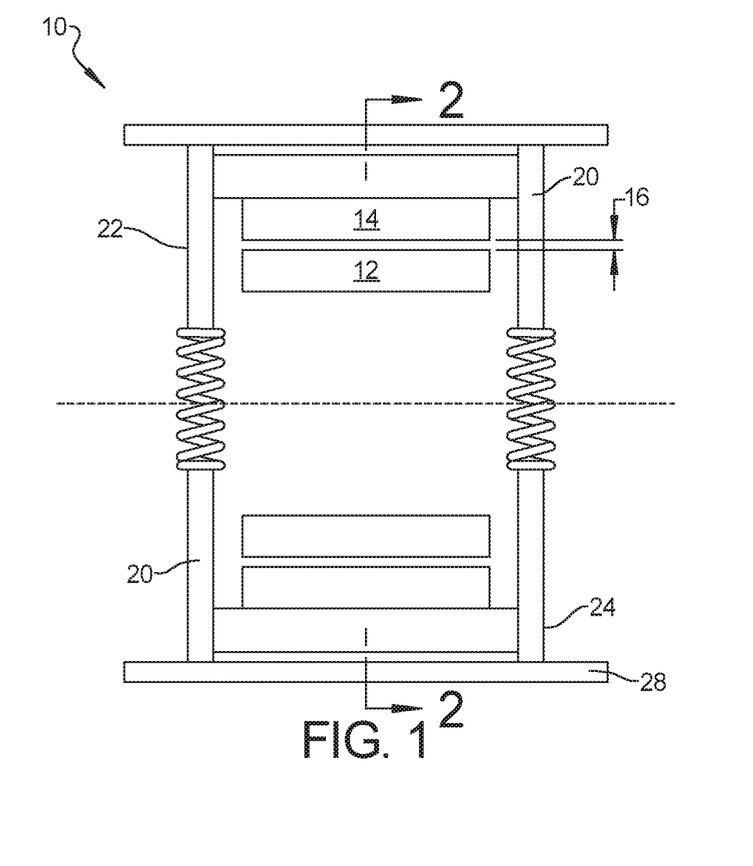
FIG. 1 is a cross sectional side view of an electric machine in accordance with an exemplary embodiment of the present disclosure.
Figure 2:
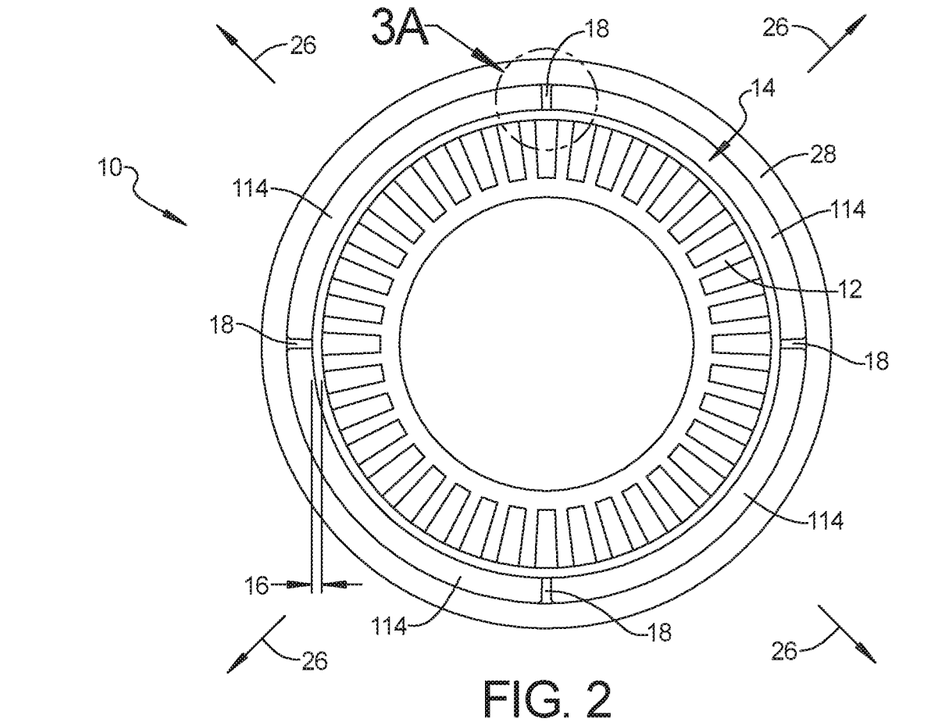
FIG. 2 is a cross sectional end view of the electric machine of FIG. 1.

Referring to FIG. 1 and FIG. 2, a sectional view of an electric machine 10 in accordance with the present disclosure is generally shown. In an exemplary embodiment, the electric machine 10 is an electric motor having a stator 12 and a rotor 14 positioned in operational engagement with one another and defining a radial gap 16 extending circumferentially between the stator 12 and the rotor 14.

The rotor 14 includes a plurality of rotor segments 114 defining a plurality of segment gaps 18 between adjacent pairs of the plurality of rotor segments 114. The electric machine 10 includes a pair of flex plates 20. One flex plate 20 is positioned at opposing distal ends 22, 24 of the electric machine 10. Each flex plate 20 includes a plurality of plate segments 120 and each of the plate segments 120 is attached to one of the plurality of rotor segments 114. As shown, each flex plate 20 includes four plate segments 120 and the rotor 14 includes four rotor segments 114 and four segment gaps 18. The plate segments 120, and the attached rotor segments 114 are radially moveable relative to the stator 12, as indicated by arrows 26, shown in FIG. 2. Movement of the plurality of plate segments 120 radially outward increases the radial gap 16 between the stator 12 and the rotor 14 and the segment gaps 18 between adjacent pairs of the plurality of rotor segments 114.

Figure 3A:
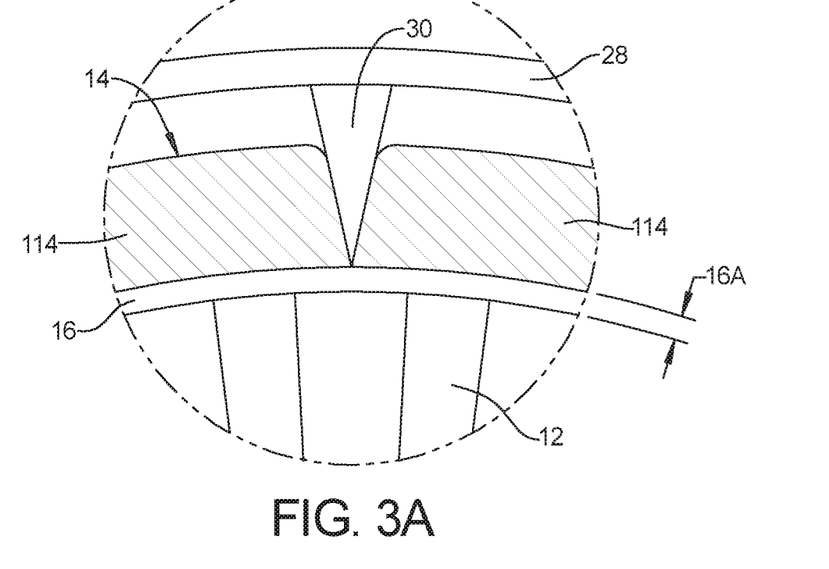
FIG. 3A is an enlarged portion of FIG. 2, as indicated by the dashed circle labelled 3A in FIG. 2, wherein the plate segments are shown radially inward.
Figure 3B:
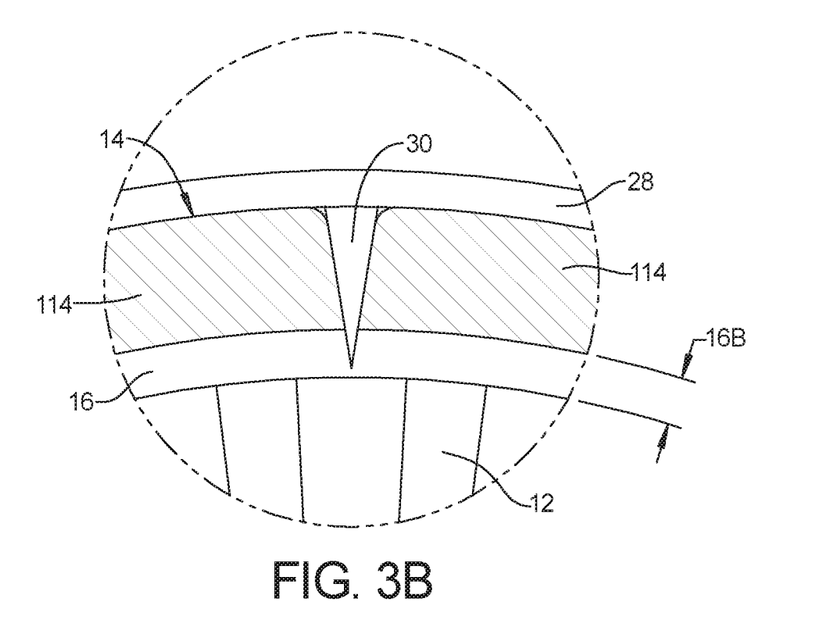
FIG. 3B is an enlarged portion of FIG. 2, similar to FIG. 3A, wherein the plate segments are shown expanded radially outward.

The plurality of plate segments 120 are flexibly held in position relative to one another. Referring to FIG. 3A, when the rotor 14 is not spinning, this flexible hold biases each of the plurality of plate segments 120, and consequently, the rotor segments 114, radially inward, where the radial gap 16 is at a minimum length 16A. When the electric machine 10 is starting up and running at low speeds, a smaller radial gap 16 is beneficial. When the plate segments 120 and rotor segments 114 begin to spin at higher speeds, centrifugal forces push each of the plurality of plate segments 120 and rotor segments 114 against the bias of the flexible hold. Referring to FIG. 3B, when the rotor 14 is spinning at sufficiently high speeds, the centrifugal forces overcome the biasing of the flexible hold and causes each of the plurality of plate segments 120 and rotor segments 114 to move radially outward, as indicated by arrows 26, expanding the radial gap 16 between the rotor 14 and the stator 12 to a maximum length 16B.

Referring again to FIG. 1 and FIG. 2, in an exemplary embodiment, the electric machine 10 includes a sleeve 28 extending circumferentially around the plurality of plate segments 120 and rotor segments 114. The sleeve 28 is adapted to stop movement of the plurality of plate segments 120 radially outward to limit further expansion of the radial gap 16. The sleeve 28 provides a positive stop for radial movement of the plurality of plate segments 120 and establishes a maximum length 16B of the radial gap 16. As the rotor 14 speeds up, the centrifugal force will gradually increase causing the radial gap 16 to gradually increase from the minimum length 16A toward the maximum length 16B.

At a certain rotational speed, the centrifugal force will push the plurality of plate segments 120 outward against the sleeve 28 and the radial gap 16 will be at the maximum length 16B. At this point, any further increase in the rotational speed of the rotor 14 will not have an effect on the radial gap 16. When the rotor 14 slows, the centrifugal force will gradually decrease, causing the radial gap 16 to gradually decrease from the maximum length 16B toward the minimum length 16A. At a certain rotational speed, the centrifugal force will be low enough that the biasing hold will pull the plurality of plate segments 120 and rotor segments 114 radially inward and the radial gap 16 will once again be at the minimum length 16A.

In another exemplary embodiment, the sleeve 28 includes a plurality of ferrous wedges 30 extending radially inward. One ferrous wedge 30 extends into the segment gap 18 between each adjacent pair of rotor segments 114. As shown in FIG. 2, FIG. 3A and FIG. 3B, the sleeve 28 includes four ferrous wedges 30, one extending radially inward into each of the four segment gaps 18 between adjacent pairs of the four rotor segments 114. The ferrous wedges 30 are made from a conductive ferrous material that is magnetically permeable (soft magnetic) and are adapted to provide a continuous conductive connection between each adjacent pair of rotor segments 114 as the plurality of rotor segments 114 move radially outward and the segment gap 18 between each adjacent pair of rotor segments 114 increases.

Figure 4A:
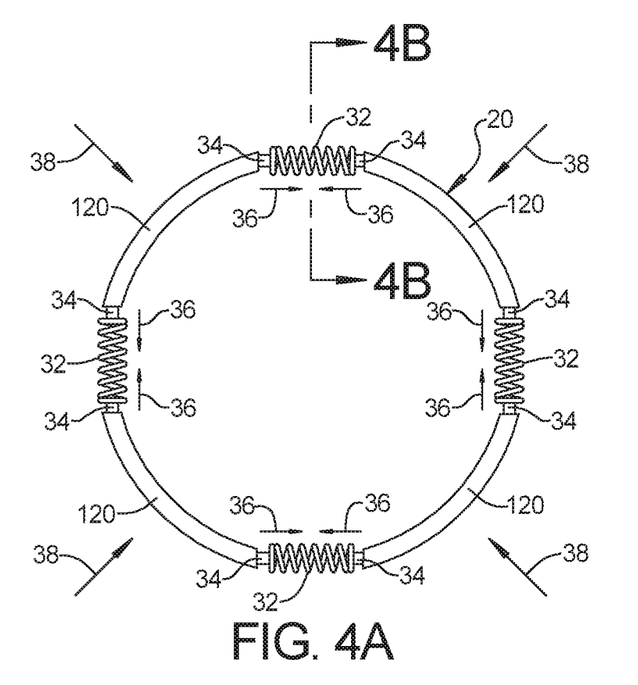
FIG. 4A is an end view of a flex plate according to an exemplary embodiment, wherein a spring connects adjacent distal ends of adjacent pairs of plate segments of the flex plate.
Figure 4B:
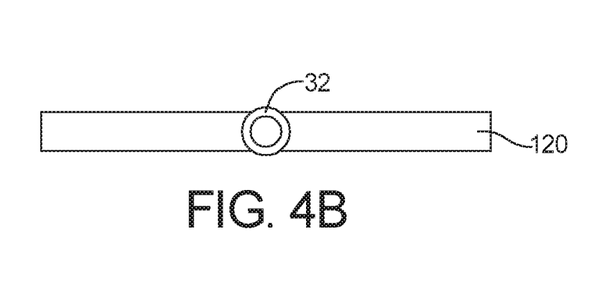
FIG. 4B is a sectional view of FIG. 4A taken along line 4B-4B in FIG. 4A.

In an exemplary embodiment, each adjacent pair of the plurality of plate segments 120 of each of the pair of flex plates 20 are flexibly connected to one another by a spring 32. Referring to FIG. 4A and FIG. 4B, each of the plurality of plate segments 120 are connected at distal ends 34 to an adjacent plate segment 120 by a spring 32. Opposite ends of the spring 32 are connected to distal ends 34 of adjacent plate segments 120. The spring 32 bridges the segment gap 18 and pulls the two adjacent plate segments 120 together. As shown in FIG. 4A, each of the flex plates 20 includes four springs 32, one bridging each of the four segment gaps 18 between adjacent pairs of the four plate segments 120. The combined biasing of the springs 32 pulling the plurality of plate segments toward one another, as shown by arrows 36, biases the plurality of plate segments 120 radially inward, as indicated by arrows 38.

Figure 4C:
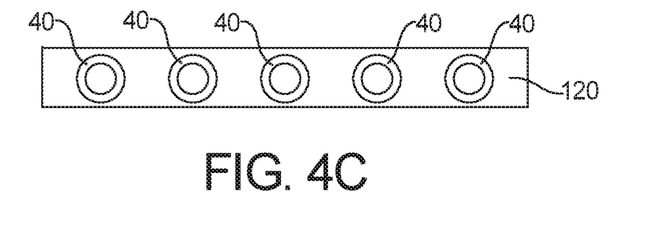
FIG. 4C is a sectional view similar to FIG. 4B of a flex plate according to another exemplary embodiment, wherein a plurality of parallel springs connect adjacent distal ends of adjacent pairs of plate segments of the flex plate.

In another exemplary embodiment, each adjacent pair of the plurality of plate segments 120 of each of the flex plates 20 are flexibly connected to one another by a plurality of parallel springs 40. Referring to FIG. 4C, opposite ends of five parallel springs 40 are connected to distal ends 34 of adjacent plate segments 120. The springs 40 bridge the segment gap 18 and pull the two adjacent plate segments 120 together similarly to the spring 32 shown in FIGS. 4A and 4B. Using a plurality of smaller parallel springs 40 achieves the same biasing force as a single larger spring 32, and reduces the overall diameter of the electric machine 10.

Figure 5A:
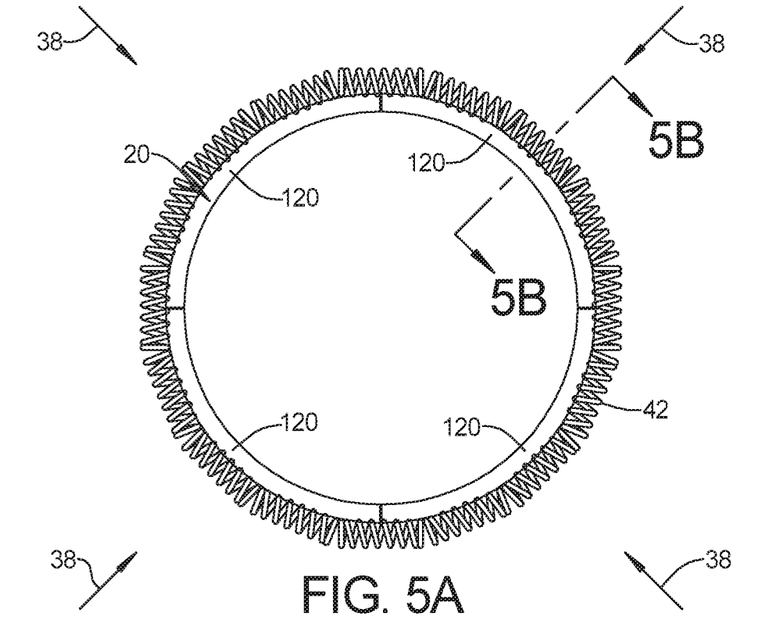
FIG. 5A is an end view of a flex plate according to another exemplary embodiment, wherein a garter spring encircles the plate segments of the flex plate.
Figure 5B:
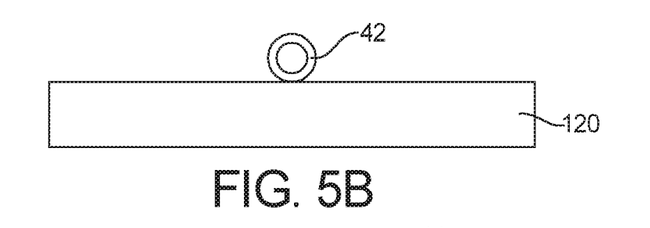
FIG. 5B is a sectional view of FIG. 5A taken along line 5B-5B in FIG. 5A.

In still another exemplary embodiment, a garter spring 42 extends circumferentially around the plurality of plate segments 120 of each of the flex plates 20. Referring to FIGS. 5A and 5B, the garter spring 42 is a helical extension or compression spring whose ends are connected so that the garter spring 42 becomes a circle and exerts radial forces. The radial biasing of the garter spring 42 biases the plurality of plate segments 120 radially inward, as indicated by arrow 38.

Figure 5C:
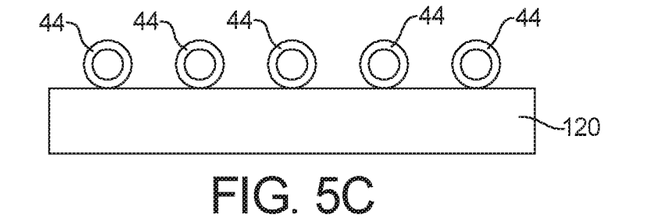
FIG. 5C is a sectional view similar to FIG. 5B of a flex plate according to another exemplary embodiment, wherein a plurality of parallel garter springs encircle the plate segments of the flex plate.

In still another exemplary embodiment, a plurality of garter springs 44 extend, parallel to one another, circumferentially around the plurality of plate segments 120. Referring to FIG. 5C, five garter springs 44 bias the plurality of plate segments 120 radially inward, as indicated by arrow 38 in FIG. 5A. Using a plurality of smaller parallel garter springs 44 achieves the same biasing force as a single larger garter spring 42, and reduces the overall diameter of the electric machine 10.

Figure 5D:
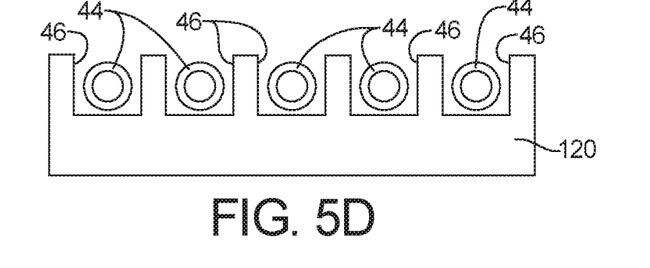
FIG. 5D is a sectional view similar to FIG. 5B of a flex plate according to another exemplary embodiment, wherein a plurality of parallel garter springs positioned within channels encircle the plate segments of the flex plate.

Referring to FIG. 5D, in still another exemplary embodiment, a plurality of garter springs 44 extend, parallel to one another, circumferentially around the plurality of plate segments 120 within channels 46 formed within the plate segments 120. The channels 46 keep the parallel springs 44 separated and ensure even radial loading across the width of the flex plate 20.

Figure 6A:
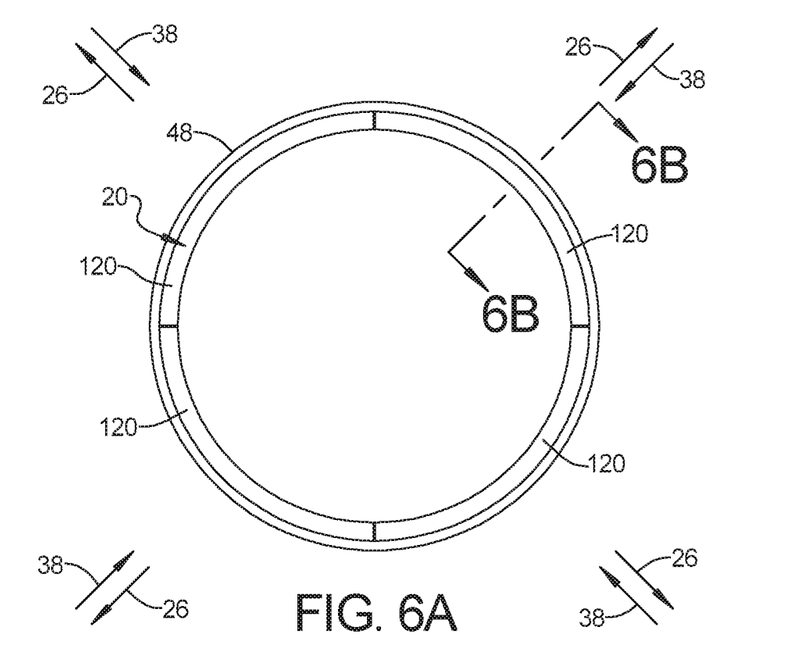
FIG. 6A is an end view of a flex plate according to another exemplary embodiment, wherein a elastomeric material encircles the plate segments of the flex plate.
Figure 6B:
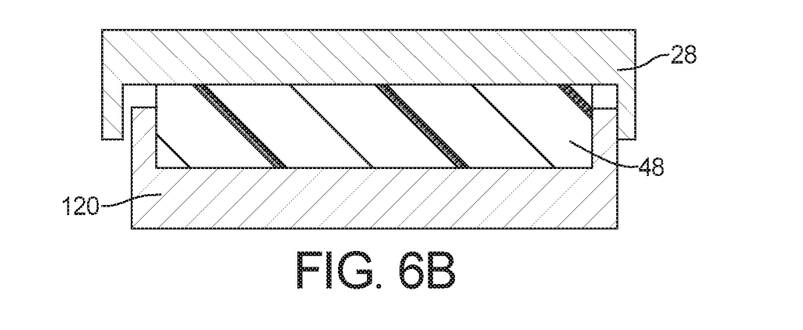
FIG. 6B is a sectional view taken along line 6B-6B of FIG. 6A.

In still another exemplary embodiment, a layer of elastomeric material 48 extends circumferentially entirely around the plurality of plate segments 120. Referring to FIG. 6A and FIG. 6B, the elastomeric material 48 exerts radial forces that bias the plurality of plate segments 120 radially inward, as indicated by arrow 38. When the rotor 14 spins at sufficiently high speeds, the centrifugal forces generated overcome the biasing effect of the layer of elastomeric material 48, the elastomeric material 48 stretches, the plurality of plate segments 120 and rotor segments 114 move radially outward, as indicated by arrows 26 and the radial gap 16 gradually increases.

In each case, when the rotor 14 spins as sufficiently high speeds, the centrifugal forces generated overcome the biasing effect of either the spring 32, the plurality of springs 40, the garter spring 42, the plurality of garter springs 44 or the layer of elastomeric material 48; the spring 32, the plurality of springs 40, the garter spring 42, the plurality of garter springs 44 or the layer of elastomeric material 48 stretches; the plurality of plate segments 120 and the plurality of rotor segments 114 move radially outward and the radial gap 16 gradually increases. When the rotor 14 slows, the centrifugal force will gradually decrease; the spring 32, the plurality of springs 40, the garter spring 42, the plurality of garter springs 44 or the layer of elastomeric material 48 will contract; the plurality of plate segments 120 and the plurality of rotor segments 114 will move radially inward and the radial gap 16 gradually decreases.

In other exemplary embodiments, the electric machine 10 does not include flex plates 20, rather the rotor segments 114 themselves are flexibly connected to one another.

Figure 7A:
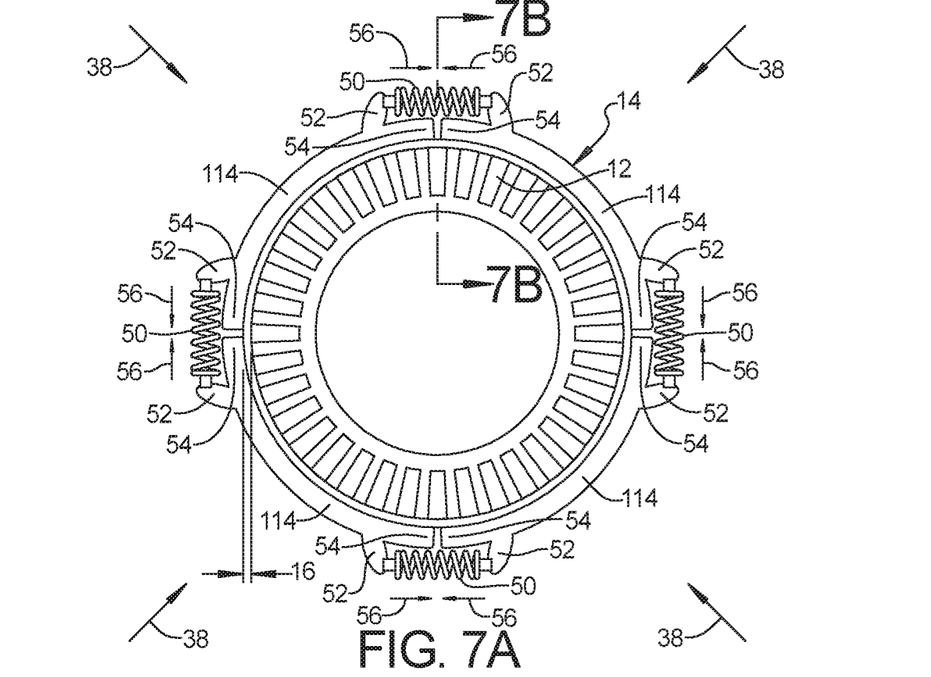
FIG. 7A is an end view of an electric machine according to an exemplary embodiment, wherein a spring connects adjacent distal ends of adjacent pairs of rotor segments of the rotor.
Figure 7B:
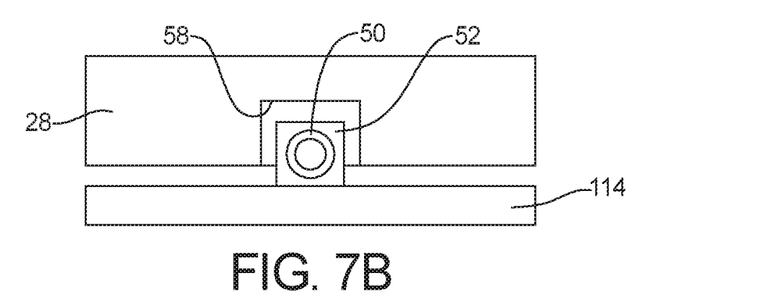
FIG. 7B is a sectional view taken along line 7B-7B in FIG. 7A.

In an exemplary embodiment, each adjacent pair of the plurality of rotor segments 114 are flexibly connected to one another by a spring 50. Referring to FIG. 7A and FIG. 7B, each of the plurality of rotor segments 114 includes a finger 52 extending radially outward near each distal end 54 of the rotor segment 114. Opposite ends of the spring 50 are connected to the fingers 52 of two adjacent rotor segments 114. The spring 50 bridges the segment gap 18 and pulls the two adjacent rotor segments 114 together. As shown, there are four springs 50 attached to eight fingers 52 of the four rotor segments 114. The combined biasing of the four springs 50 pulling the plurality of rotor segments 114, as indicated by arrows 56, biases the plurality of rotor segments 114 radially inward, as indicated by arrows 38. As shown in FIG. 7B, in an exemplary embodiment, the sleeve 28 includes a radial channel 58 to accommodate the fingers 52 and springs 50 of the rotor segments 114.

Figure 7C:
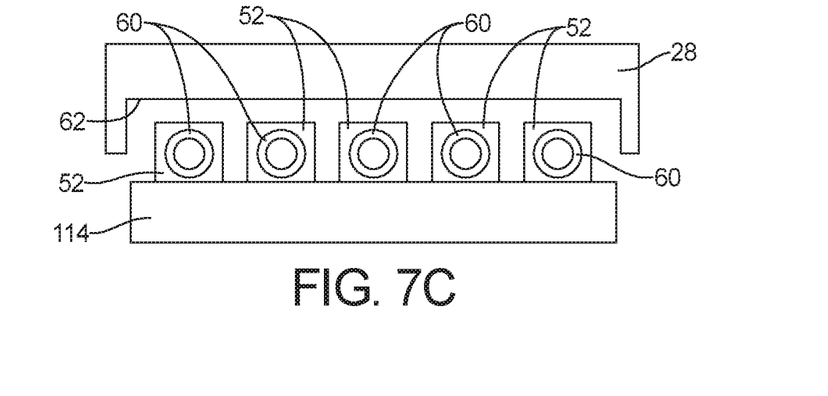
FIG. 7C is a sectional view similar to FIG. 7B of an electric machine according to another exemplary embodiment, wherein a plurality of parallel springs connect adjacent distal ends of adjacent pairs of rotor segments of the rotor.

In another exemplary embodiment, each adjacent pair of the plurality of rotor segments 114 are flexibly connected to one another by a plurality of parallel springs 60. Referring to FIG. 7C, each of the plurality of rotor segments 114 includes five fingers 52 extending radially outward near each distal end 54 of the rotor segments 114. Opposite ends of five parallel springs 60 are connected to the fingers 52 of two adjacent rotor segments 114. The springs 60 bridge the segment gap 18 and pull the two adjacent rotor segments 114 together. Using a plurality of smaller parallel springs 60 achieves the same biasing force as a single larger spring 50, and reduces the overall diameter of the electric machine 10. As shown in FIG. 7C, in an exemplary embodiment, the sleeve 28 includes a radial channel 62 to accommodate the fingers 52 and springs 60 of the rotor segments 114.

Figure 8A:
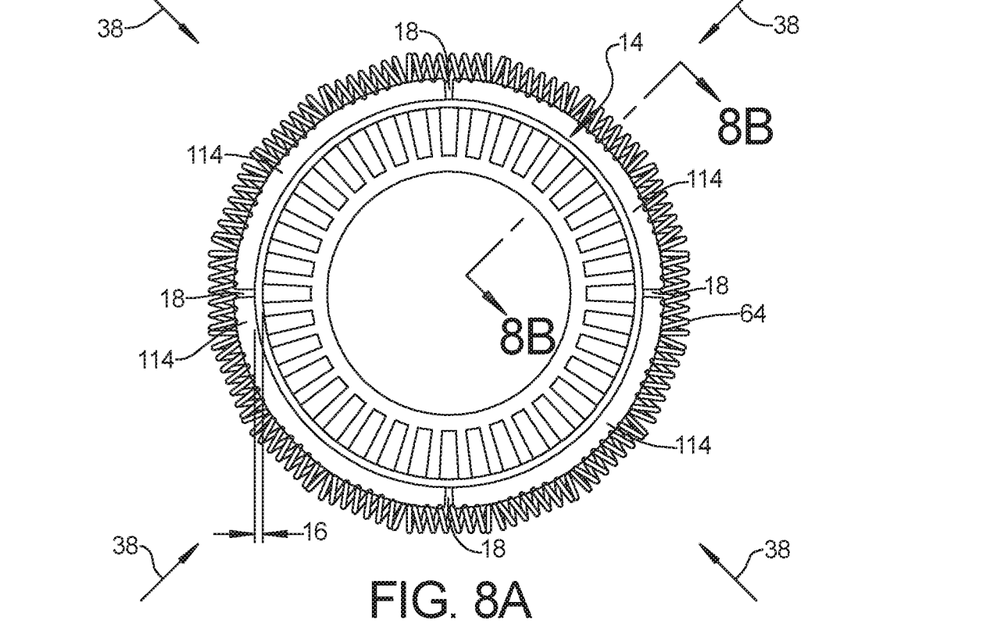
FIG. 8A is an end view of an electric machine according to another exemplary embodiment, wherein a garter spring encircles the rotor segments of the rotor.
Figure 8B:
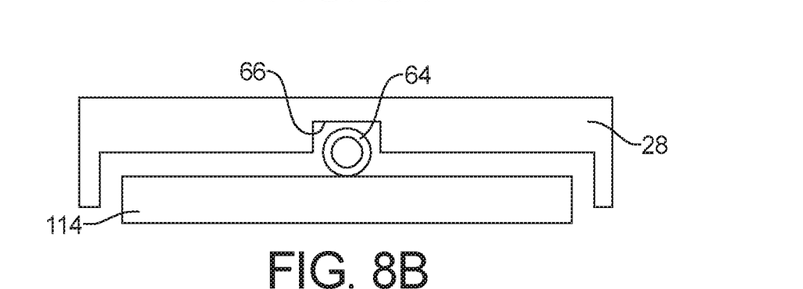
FIG. 8B is a sectional view of FIG. 8A taken along line 8B-8B in FIG. 8A.

In still another exemplary embodiment, a garter spring 64 extends circumferentially around the plurality of rotor segments 114. Referring to FIGS. 8A and 8B, the garter spring 64 is a helical extension or compression spring whose ends are connected so that the garter spring 64 becomes a circle and exerts radial forces. The radial biasing of the garter spring 64 biases the plurality of rotor segments 114 radially inward, as indicated by arrows 38. As shown in FIG. 8B, in an exemplary embodiment, the sleeve 28 includes a radial channel 66 to accommodate the garter spring 64 encircling the rotor segments 114.

Figure 8C:
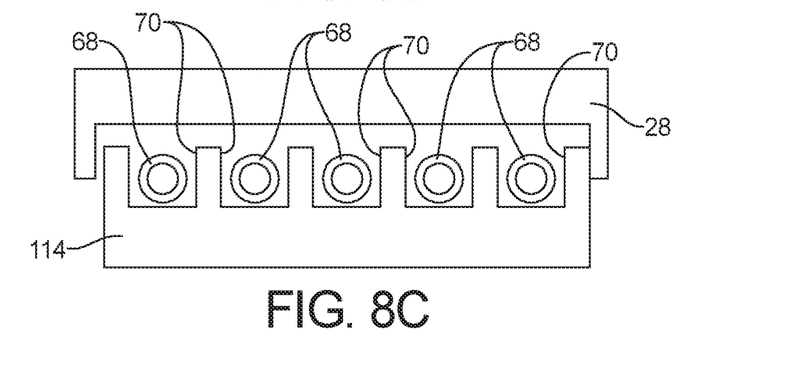
FIG. 8C is a sectional view similar to FIG. 8B of a flex plate according to another exemplary embodiment, wherein a plurality of parallel garter springs positioned within channels encircle the rotor segments of the rotor.

In still another exemplary embodiment, a plurality of garter springs 68 extend, parallel to one another, circumferentially around the plurality of rotor segments 114. Referring to FIG. 8C, five garter springs 68 extend circumferentially around the plurality of rotor segments 114 within channels 70 formed in each of the plurality of rotor segments 114 and bias the plurality of rotor segments 114 radially inward. Using a plurality of smaller parallel garter springs 68 achieves the same biasing force as a single larger garter spring 64, and reduces the overall diameter of the electric machine 10.

Figures 9A, 9B:
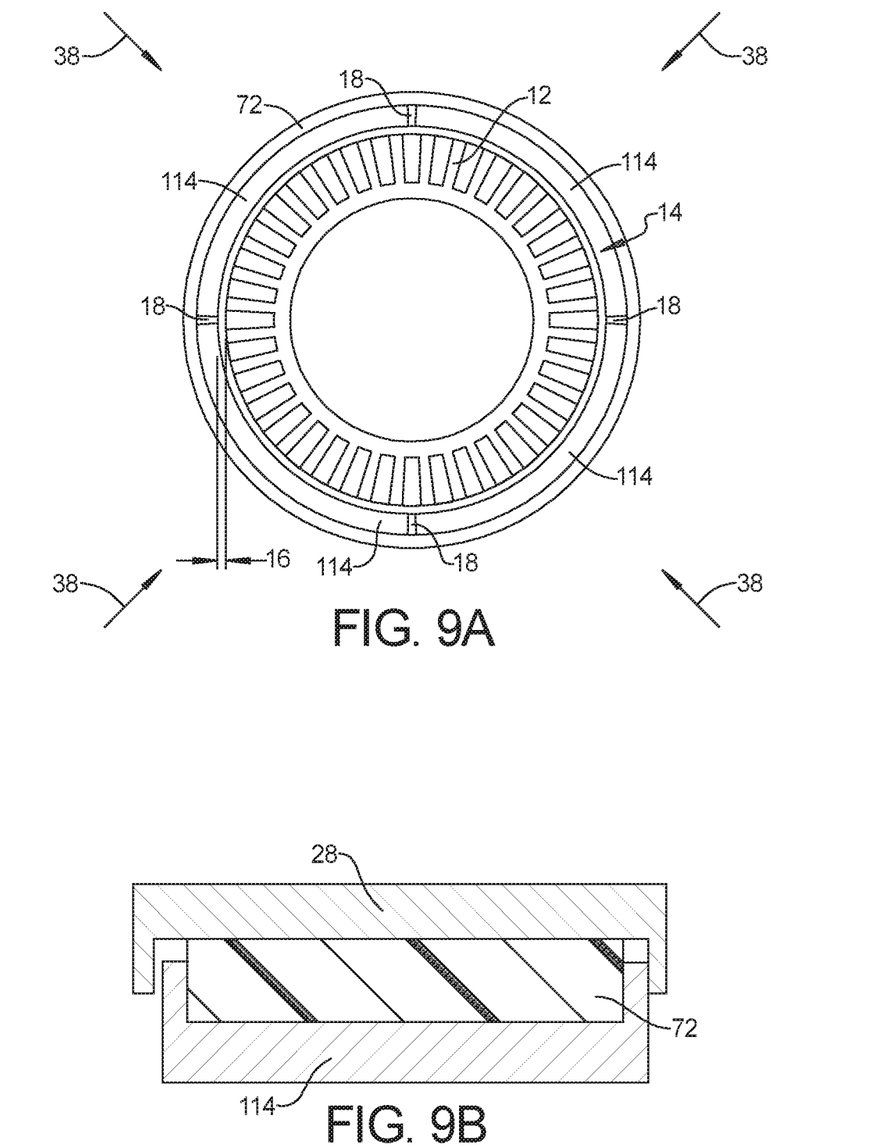
FIG. 9A is an end view of an electric machine according to another exemplary embodiment, wherein a elastomeric material encircles the rotor segments of the rotor.
FIG. 9B is a sectional view taken along line 9B-9B of FIG. 9A.

In still another exemplary embodiment, a layer of elastomeric material 72 extends circumferentially entirely around the plurality of rotor segments 114. Referring to FIG. 9A and FIG. 9B, the elastomeric material 72 exerts radial forces that bias the plurality of rotor segments 114 radially inward, as indicated by arrows 38. When the rotor 14 spins as sufficiently high speeds, the centrifugal forces generated overcome the biasing effect of the layer of elastomeric material 72, the elastomeric material 48 stretches, the plurality of rotor segments 114 move radially outward and the radial gap 16 gradually increases.

In each case, when the rotor 14 spins at sufficiently high speeds, the centrifugal forces generated overcome the biasing effect of either the spring 50, the plurality of springs 60, the garter spring 64, the plurality of garter springs 68 or the layer of elastomeric material 72; the spring 50, the plurality of springs 60, the garter spring 64, the plurality of garter springs 68 or the layer of elastomeric material 72 stretches; the plurality of rotor segments 114 move radially outward and the radial gap 16 gradually increases. When the rotor 14 slows, the centrifugal force will gradually decrease; the spring 50, the plurality of springs 60, the garter spring 64, the plurality of garter springs 68 or the layer of elastomeric material 72 will contract; the plurality of rotor segments 114 will move radially inward and the radial gap 16 gradually decreases. This provides passive expansion of the radial gap 16 as the rotational speed of the rotor 14 increases to reduce losses within the electric machine 10.

Figure 10A:
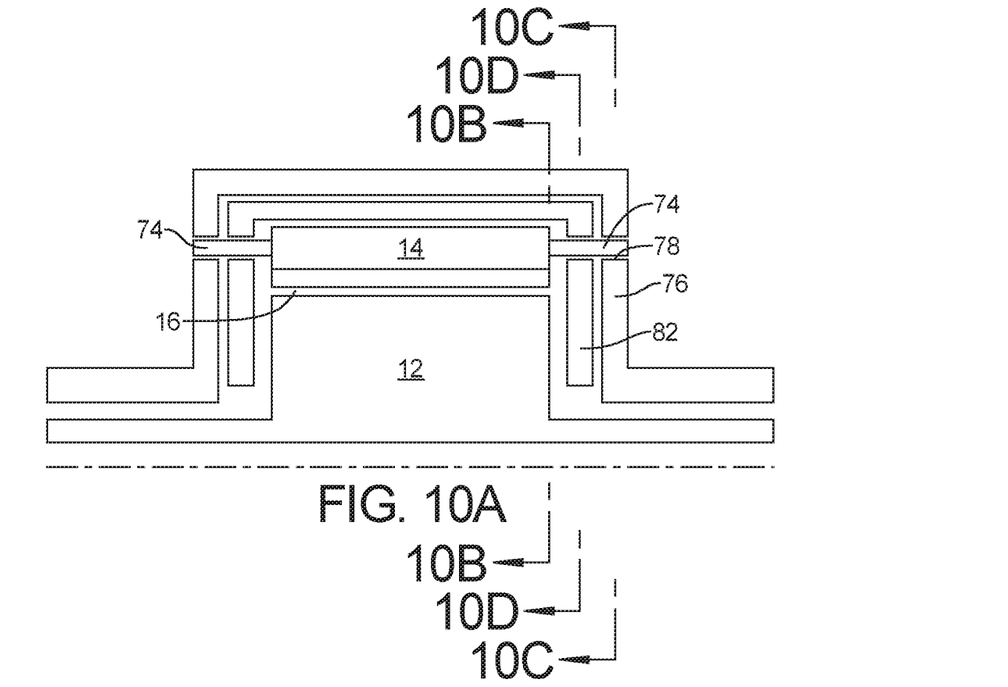
FIG. 10A is a partial side sectional view of an electric machine according to another exemplary embodiment.
Figure 10B:
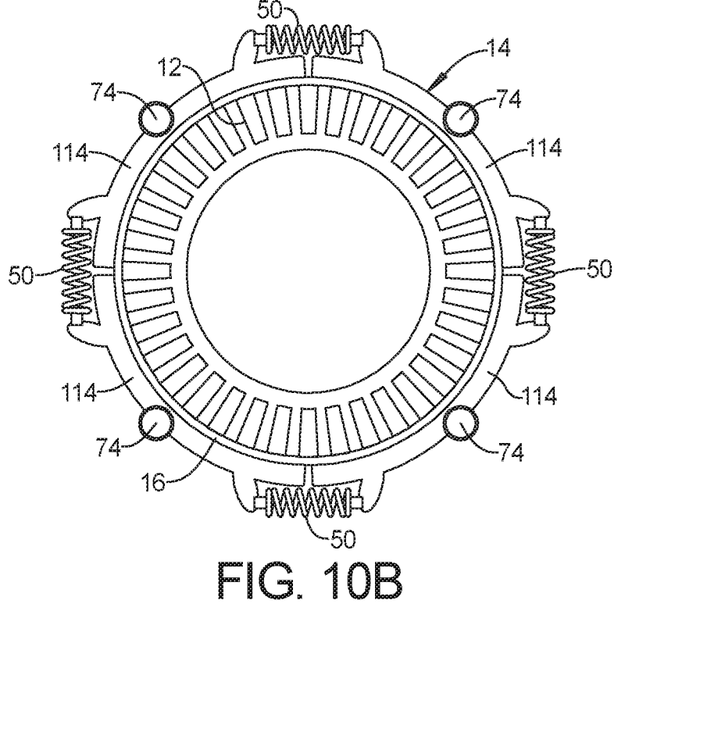
FIG. 10B is an end sectional view taken along line 10B-10B of FIG. 10A.

Referring to FIG. 10A and FIG. 10B, in still another exemplary embodiment, each of the plurality of rotor segments 114 includes an axial pin 74 extending therefrom.

Figure 10C:
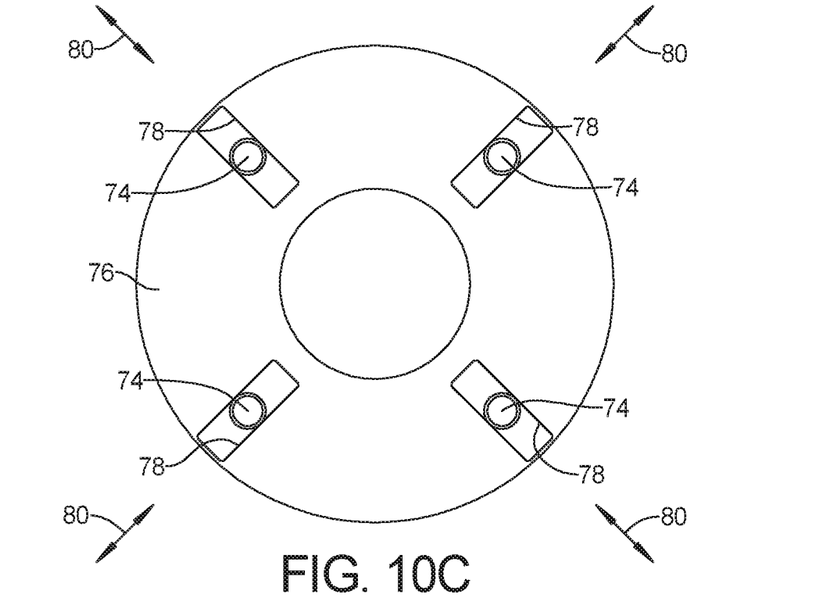
FIG. 10C is an end sectional view taken along line 10C-10C of FIG. 10A.

A torque plate 76 is rotationally fixed to the rotor 14 and includes a plurality of expansion channels 78. The plurality of expansion channels 78 may be straight or curved and provide a path for the axial pins 74 when the plurality of rotor segments 114 move radially outward. Referring to FIG. 10C, in an exemplary embodiment, each of the plurality of expansion channels 78 is straight and extends radially outward from a central axis of the electric machine 10. The axial pin 74 of each of the plurality of rotor segments 114 is positioned within one of the plurality of expansion channels 78 such that the plurality of rotor segments are free to move radially back and forth, as indicated by arrows 80.

Figure 10D:
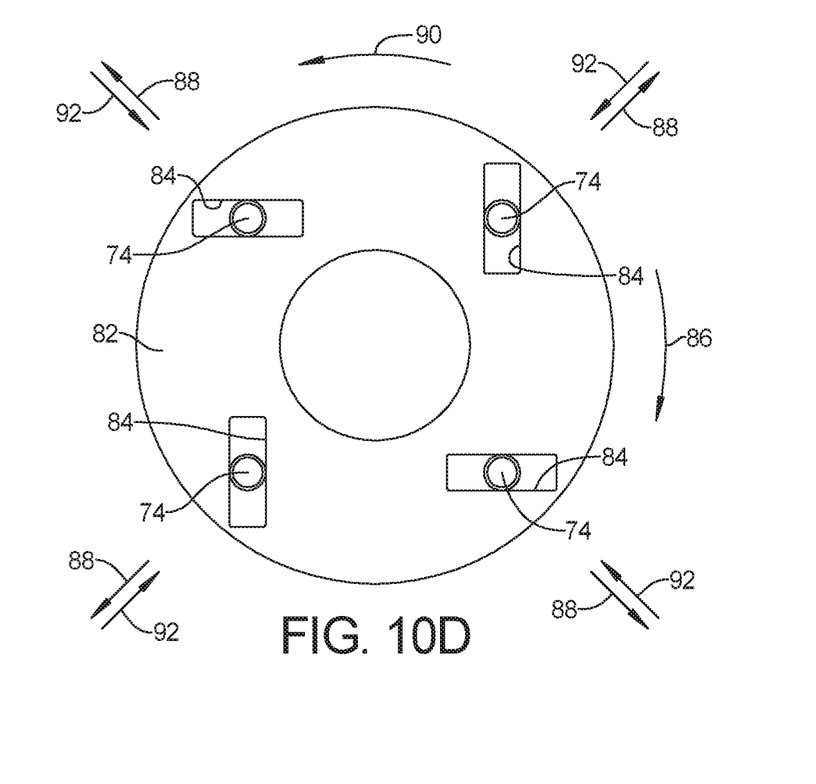
FIG. 10D is an end sectional view taken along line 10D-10D of FIG. 10A.

An expansion plate 82 is positioned adjacent the torque plate 76 and is rotatable relative to the torque plate 76 and the rotor 14. The expansion plate 82 has a plurality of control channels 84. The plurality of control channels 84 may be straight or curved and provide a path for the axial pins 74 when the plurality of rotor segments 114 move radially outward. Referring to FIG. 10D, in an exemplary embodiment, each of the plurality of control channels 84 is straight and extends at an angle relative to the expansion channels 78. The axial pin 74 of each of the plurality of rotor segments 114 is positioned within one of the plurality of angled channels 84 such that radial movement of the plurality of rotor segments 114 is controlled by rotational movement of the expansion plate 82 relative to the torque plate 76. The expansion channels 78 and the control channels 84 may be curved or straight and are not parallel or collinear with each other. At no point where an axial pin 74 of one of the plurality of rotor segments 114 extends through an expansion channel 78 and an adjacent control channel 84 are the slope or angle of the expansion channel 78 and the slope or angle of the control channel 84 the same. Therefore, if the expansion plate 82 and the torque plate 76 are held rotationally stationary relative to one another, the path that the expansion channels 78 provide for the axial pins 74 is not the same as the path that the control channels 84 provide for the axial pins 74. In this condition, the axial pins 74, and correspondingly, the rotor segments 114 will be prevented from radial movement. Radial movement of the axial pins 74 within the expansion channels 78 is only possible when the expansion plate 82 is rotated relative to the torque plate 76.

Referring again to the exemplary embodiment shown in FIG. 10D, selective rotation of the expansion plate 82, as indicated by arrow 86, will allow the axial pins 74 of the plurality of rotor segments 114 to move radially outward, as indicated by arrows 88. Selective rotation of the expansion plate 82, as indicated by arrow 90, will force the axial pins 74 of the plurality of rotor segments 114 to move radially inward, as indicated by arrows 92. The torque plate 76 and the expansion plate 82 allow selective active control of the radial expansion of the rotor segments 114 allowing an operator or controller to over-ride or augment the passive radial expansion of the rotor segments 114 described above.

What is claimed is:

1. An electric machine, comprising:
   a stator and a rotor positioned in operational engagement with one another and defining a radial gap extending circumferentially between the stator and the rotor;
   the rotor including a plurality of rotor segments defining a plurality of segment gaps between adjacent pairs of the plurality of rotor segments, the rotor segments radially moveable relative to the stator, wherein movement of the plurality of rotor segments radially outward increases the radial gap between the stator and the rotor and the segment gaps between adjacent pairs of the plurality of rotor segments.

2. The electric machine of claim 1, wherein the plurality of rotor segments are flexibly held in position relative to one another such that when the rotor spins centrifugal forces cause the plurality of rotor segments to move radially outward expanding the radial gap between the rotor and the stator.

3. The electric machine of claim 2, wherein each adjacent pair of the plurality of rotor segments are flexibly connected to one another by a spring.

4. The electric machine of claim 2, wherein each adjacent pair of the plurality of rotor segments are flexibly connected to one another by a plurality of parallel springs.

5. The electric machine of claim 2, wherein a garter spring extends circumferentially around the plurality of rotor segments.

6. The electric machine of claim 2, wherein a plurality of garter springs extend, parallel to one another, circumferentially around the plurality of rotor segments.

7. The electric machine of claim 2, wherein a layer of elastomeric material extends circumferentially around the plurality of rotor segments.

8. The electric machine of claim 2, further including a pair of flex plates, one flex plate being positioned at opposing distal ends of the electric machine, each flex plate including a plurality of plate segments, each of the plate segments being attached to one of the plurality of rotor segments.

9. The electric machine of claim 8, wherein each adjacent pair of the plurality of plate segments of each flex plate are flexibly connected to one another by a spring.

10. The electric machine of claim 8, wherein each adjacent pair of the plurality of plate segments of each flex plate are flexibly connected to one another by a plurality of parallel springs.

11. The electric machine of claim 8, wherein each flex plate includes a garter spring extending circumferentially around the plurality of plate segments.

12. The electric machine of claim 8, wherein each flex plate includes a plurality of garter springs extending, parallel to one another, circumferentially around the plurality of plate segments.

13. The electric machine of claim 8, wherein each flex plate includes a layer of elastomeric material extending circumferentially around the plurality of plate segments.

14. The electric machine of claim 2, further including a sleeve extending circumferentially around the plurality of rotor segments, the sleeve adapted to stop movement of the plurality of rotor segments radially outward to limit further expansion of the radial gap.

15. The electric machine of claim 14, wherein the sleeve includes a plurality of ferrous wedges extending radially inward, one ferrous wedge extending into the segment gap between each adjacent pair of rotor segments and adapted to provide a continuous conductive connection between each adjacent pair of rotor segments as the plurality of rotor segments move radially outward and the segment gap between each adjacent pair of rotor segments increases.

16. The electric machine of claim 15, wherein each of the plurality of rotor segments includes an axial pin extending therefrom, the electric machine further including:
   a torque plate rotationally fixed to the rotor and having a plurality of expansion channels, the axial pin of each of the plurality of rotor segments positioned within one of the plurality of expansion channels; and
   an expansion plate, rotatable relative to the torque plate and the rotor and having a plurality of control channels, the axial pin of each of the plurality of rotor segments positioned within one of the plurality of control channels, wherein the plurality of expansion channels and the plurality of control channels are not collinear or parallel, such that radial movement of the plurality of rotor segments is controlled by rotational movement of the expansion plate relative to the torque plate.

17. An electric machine, comprising:

a stator and a rotor positioned in operational engagement with one another and defining a radial gap extending circumferentially between the stator and the rotor;

the rotor including a plurality of rotor segments defining a plurality of segment gaps between adjacent pairs of the plurality of rotor segments, the plurality of rotor segments radially moveable relative to the stator and flexibly held in position relative to one another such that when the rotor spins, centrifugal forces cause the plurality of rotor segments to move radially outward expanding the radial gap between the rotor and the stator and the segment gaps between adjacent pairs of the plurality of rotor segments; and a sleeve extending circumferentially around the plurality of rotor segments, the sleeve adapted to stop movement of the plurality of rotor segments radially outward to limit further expansion of the radial gap and including a plurality of ferrous wedges extending radially inward, one ferrous wedge extending into the segment gap between each adjacent pair of rotor segments and adapted to provide a continuous conductive connection between each adjacent pair of rotor segments as the plurality of rotor segments move radially outward and the segment gap between each adjacent pair of rotor segments increases.

18. The electric machine of claim 17, wherein the plurality of rotor segments are flexibly held in position by one of a spring connecting each adjacent pair of the plurality of rotor segments, a plurality of parallel springs connecting each adjacent pair of the plurality of rotor segments, a garter spring extending circumferentially around the plurality of rotor segments, a plurality of garter springs extending, parallel to one another, circumferentially around the plurality of rotor segments, and a layer of elastomeric material extending circumferentially around the plurality of rotor segments.

19. The electric machine of claim 17, further including a pair of flex plates, one flex plate being positioned at opposing distal ends of the electric machine, each flex plate including a plurality of plate segments, each of the plate segments being attached to one of the plurality of rotor segments, the plurality of plate segments flexibly held in position by one of a spring connecting each adjacent pair of the plurality of plate segments of each flex plate, a plurality of parallel springs connecting each adjacent pair of the plurality of plate segments of each flex plate, a garter spring extending circumferentially around the plurality of plate segments of each flex plate, a plurality of garter springs extending, parallel to one another, circumferentially around the plurality of plate segments of each flex plate, and a layer of elastomeric material extending circumferentially around the plurality of plate segments of each flex plate.

20. The electric machine of claim 17, wherein each of the plurality of rotor segments includes an axial pin extending therefrom, the electric machine further including:

a torque plate rotationally fixed to the rotor and having a plurality of expansion channels, the axial pin of each of the plurality of rotor segments positioned within one of the plurality of expansion channels; and an expansion plate, rotatable relative to the torque plate and the rotor and having a plurality of control channels, the axial pin of each of the plurality of rotor segments positioned within one of the plurality of control channels, wherein the plurality of expansion channels and the plurality of control channels are not collinear or parallel, such that radial movement of the plurality of rotor segments is controlled by rotational movement of the expansion plate relative to the torque plate.

\* \* \* \* \*